United States Patent [19]

Hillmann

[11] 4,330,984
[45] May 25, 1982

[54] CROP DIVIDER ASSEMBLY

[76] Inventor: De Lloyd F. Hillmann, 246 W. 6th St., Gibbon, Minn. 55335

[21] Appl. No.: 193,488

[22] Filed: Oct. 3, 1980

[51] Int. Cl.³ .............................................. A01D 63/00
[52] U.S. Cl. ...................................... 56/314; 56/17.3
[58] Field of Search ................ 56/314, 315, 316, 317, 56/318, 319, 320, 17.3, DIG. 9, 14.2, 14.3, 14.4

[56] References Cited

U.S. PATENT DOCUMENTS

| | | | |
|---|---|---|---|
| 819,797 | 5/1906 | Rand | 56/318 |
| 1,690,966 | 11/1928 | Chaney | 56/319 |
| 1,800,058 | 4/1931 | Dugger | 56/314 |
| 1,859,208 | 5/1932 | Kane | 56/319 |
| 2,313,670 | 3/1943 | Roberts et al. | 56/312 |
| 2,632,991 | 3/1953 | Schwartz | 56/314 |
| 2,679,719 | 6/1954 | Hill et al. | 56/314 |
| 2,862,345 | 12/1958 | Wigham | 56/98 |
| 3,421,303 | 1/1969 | Kammerzell | 56/229 |
| 3,596,454 | 8/1971 | Kluck | 56/314 |
| 3,885,377 | 5/1975 | Jones | 56/314 |
| 3,967,439 | 7/1976 | Mott | 56/314 |
| 4,269,018 | 5/1981 | Pickett | 56/314 |

*Primary Examiner*—Robert A. Hafer
*Attorney, Agent, or Firm*—Burd, Bartz & Gutenkauf

[57] ABSTRACT

A combined header is equipped with crop divider assemblies operable to direct crops into the path of movement of the header. Each divider assembly has two longitudinally aligned sections that are adjustable relative to each other to vary the length of the divider assembly. A plurality of plant guide rods extend from the forward section of the divider assembly in an upwardly and inwardly direction. The innermost rod terminates in a flexible terminal portion. Separate adjustable mount assemblies support the divider assemblies ahead of opposite ends of the reel of the header.

27 Claims, 10 Drawing Figures

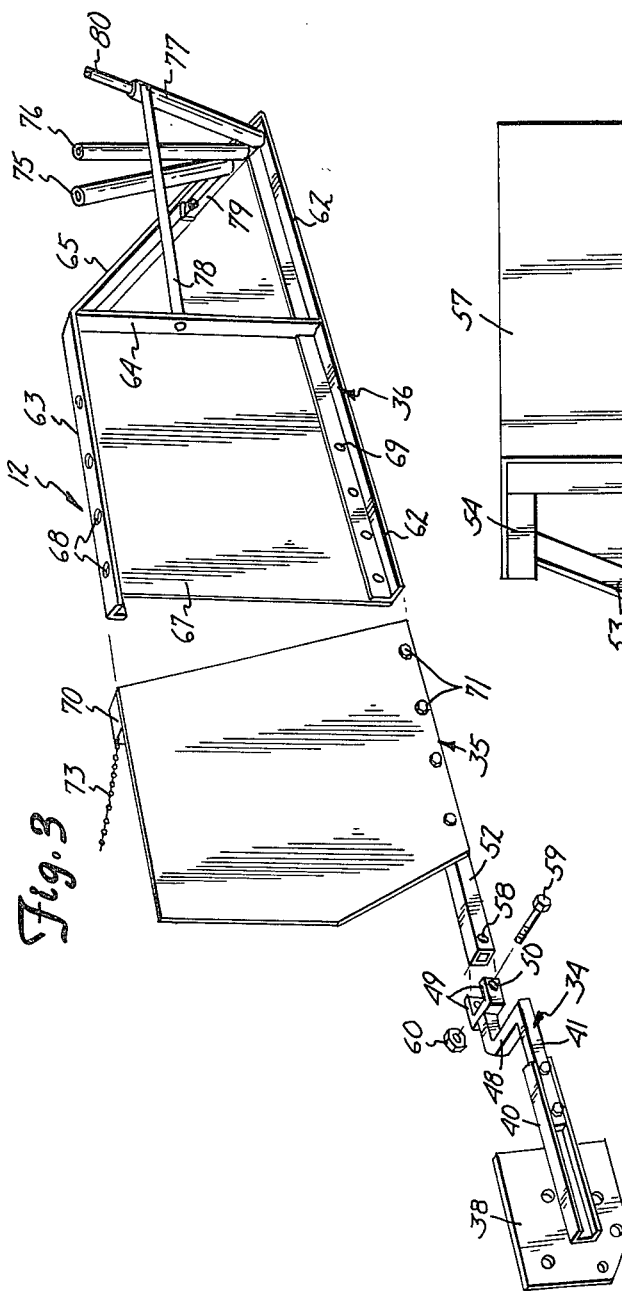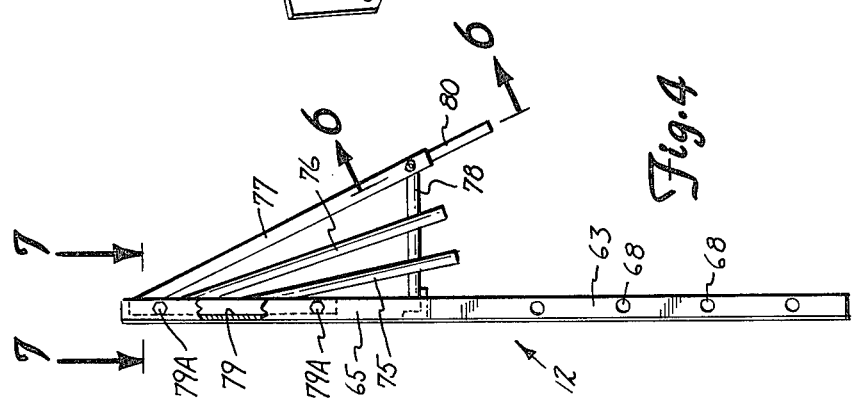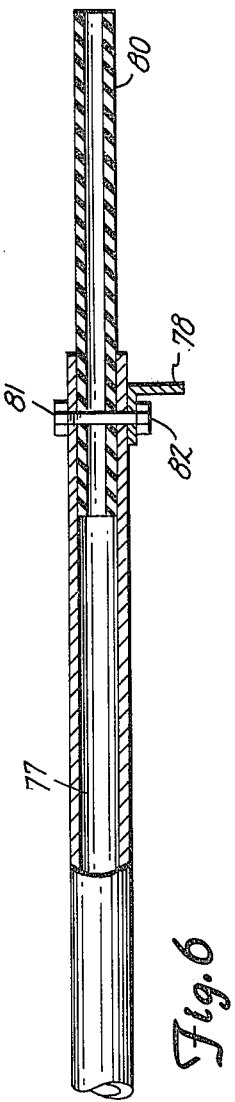

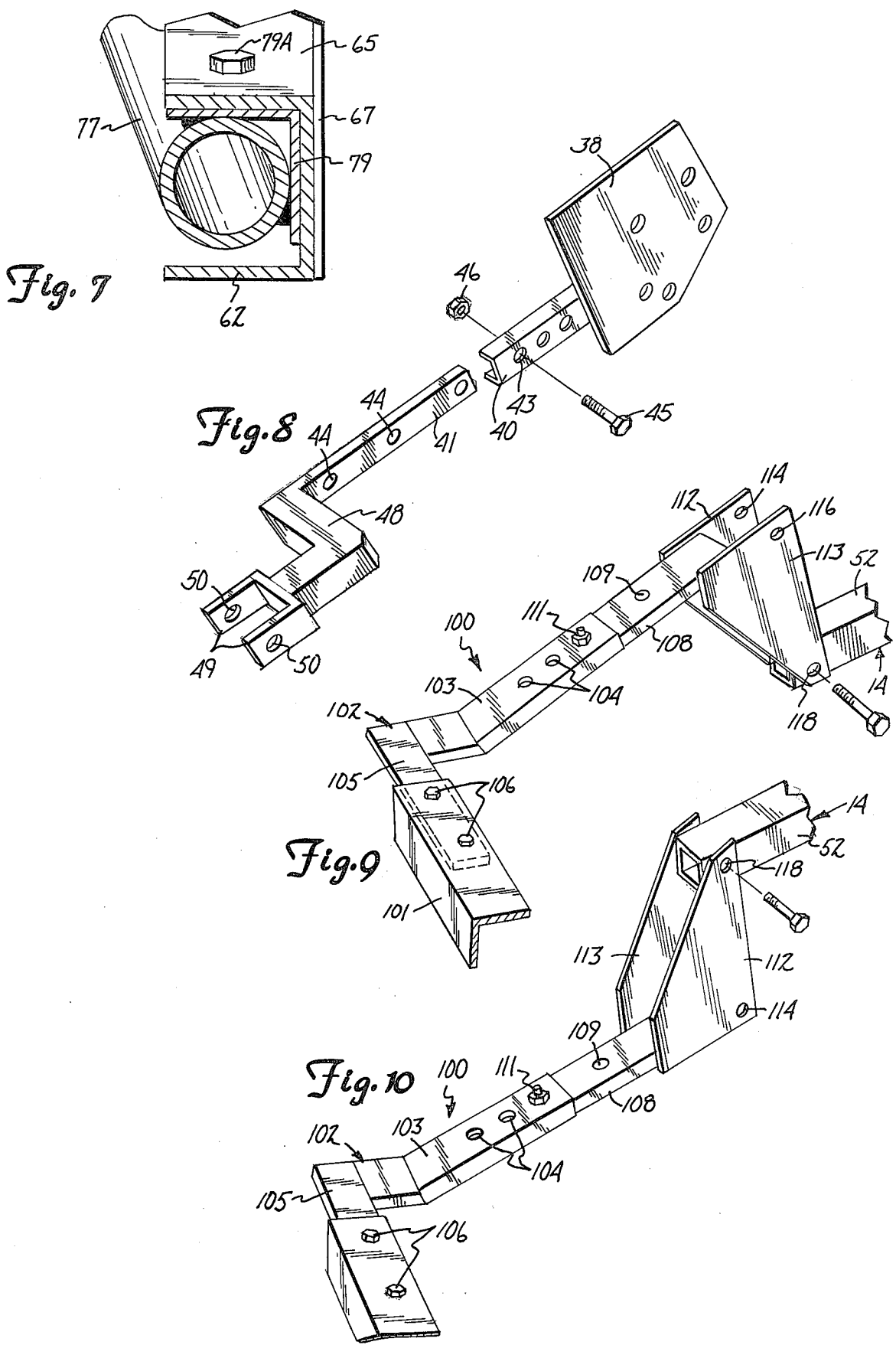

4,330,984

CROP DIVIDER ASSEMBLY

SUMMARY OF THE INVENTION

The invention relates to a divider assembly for use in connection with crop harvesting equipment for harvesting a crop, such as soybeans. A common item of harvesting equipment is a combine with a header having a rotating reel with cross members or rungs which carry tines. The reel lifts and moves the crops or plants up to be harvested toward a transverse cutter bar, such as a sickle bar. The cutter bar is coextensive with the length of the reel. Row divider units are mounted on the header at the ends of the reel. The divider units guide plants or crops located along the periphery of the intended path of travel of the header into the path of travel of the reel. Such crops located along the periphery might otherwise not be harvested, or it might be necessary to slightly overlap the previous path of harvest on the next pass. Also, the peripherally located crops are prone to tangle in the axle of the reel.

The invention comprises a crop divider assembly mountable on the end of a combine header or like harvesting equipment to guide crops located peripherally along the intended path of the reel of the header into the path of travel of the reel to be cut and processed in the normal fashion. Normally two of the divider assemblies are mounted on a header, one located at each lateral end of the reel. Each divider assembly has two longitudinally aligned sections that are adjusted relative to each other to vary the length of the divider assembly. A mounting assembly supports the two longitudinally aligned divider sections ahead of opposite ends of the reel and permits upward pivotal movement of the divider assembly in order that rough and uneven terrain may be traversed. The location of the pivot point between the mounting assembly and the divider assembly is upwardly and longitudinally adjustable. The forward location of the leading divider section is longitudinally adjustable according to the type of terrain to be traversed. The forward end of the leading divider section terminates in an apex. A plurality of plant guide rods or pipes extend from the apex in diverging relationship thereto laterally inward of the path of the header reel. The guide rods serve to guide peripherally located crops inward of the path of the reel. The innermost guide rod terminates in a flexible terminal portion that is not damaged by the reel and will not damage the reel upon accidental contact. The adjustable mounting of the divider sections and the longitudinal adjustment permitted between the leading and trailing divider sections impart versatility to the divider assembly permitting it to be mounted on various types and kinds of harvesting equipment and permitting adjustment according to the type of terrain being traversed by the harvesting equipment.

IN THE DRAWINGS

FIG. 3 is an exploded perspective view of one of the divider assemblies of FIG. 1;

FIG. 4 is a top plan view of the leading divider section of the divider assembly of FIG. 3;

FIG. 5 is a side elevational view of the trailing divider section of the divider assembly of FIG. 3 viewed from the side opposite that shown in FIG. 3;

FIG. 6 is an enlarged sectional view of a portion of the leading divider section of FIG. 4 taken along the line 6—6 thereof;

FIG. 7 is an enlarged sectional view of a portion of the leading divider section shown in FIG. 4 taken along the line 7—7 thereof;

FIG. 8 is an exploded perspective view of one embodiment of the mounting bar assembly for the divider assembly of the invention;

FIG. 9 is a perspective view of an alternate embodiment of a mount assembly for connecting a divider assembly to a header of a combine; and FIG. 10 is a view similar to FIG. 9 showing the mount assembly in its up position.

DESCRIPTION OF PREFERRED EMBODIMENT

Figure 1:
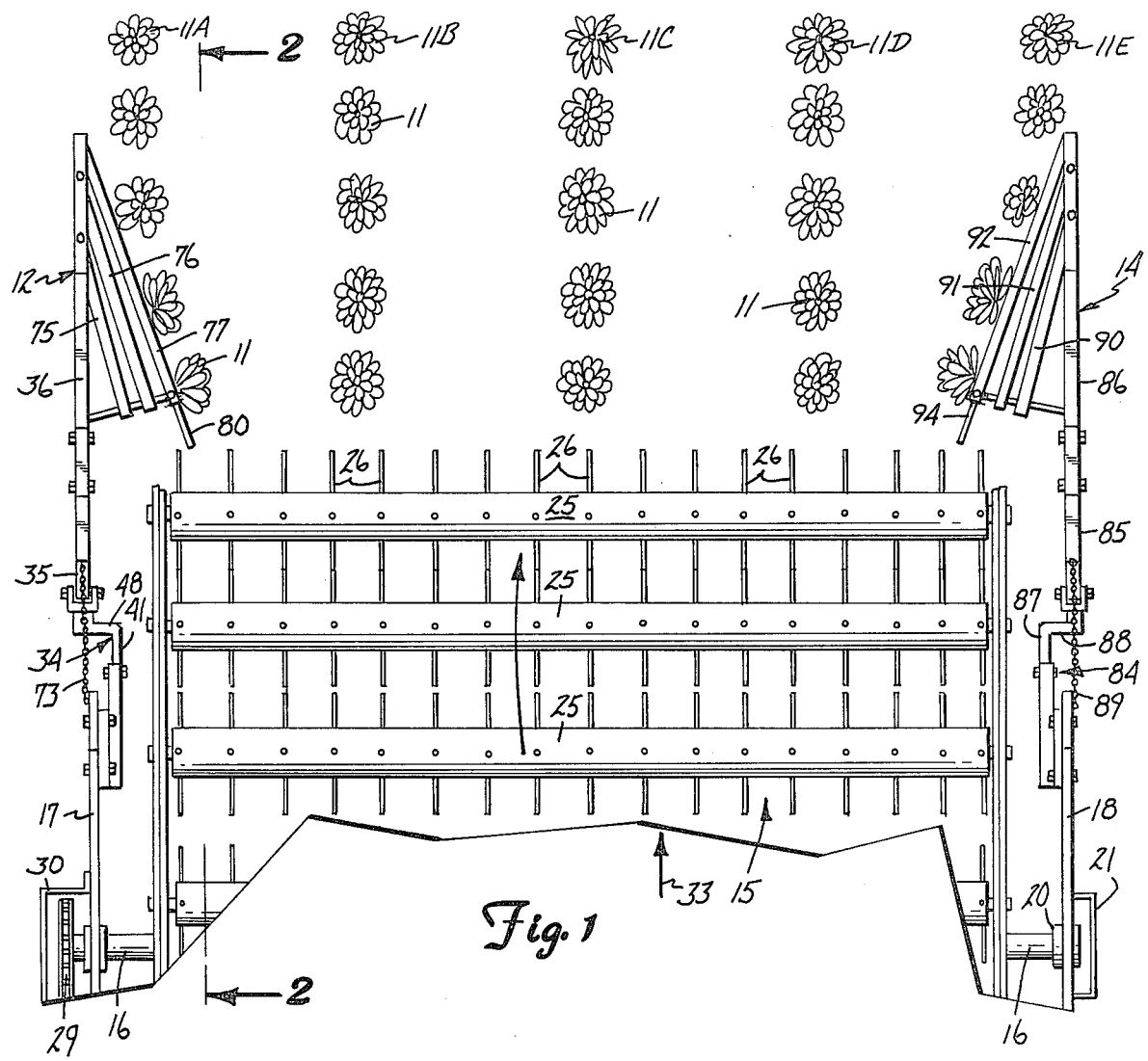
FIG. 1 is a top plan view of a combine header shown partly fragmented and having a pair of divider assemblies according to one form of the invention installed thereon in use performing a harvesting operation.
Figure 2:
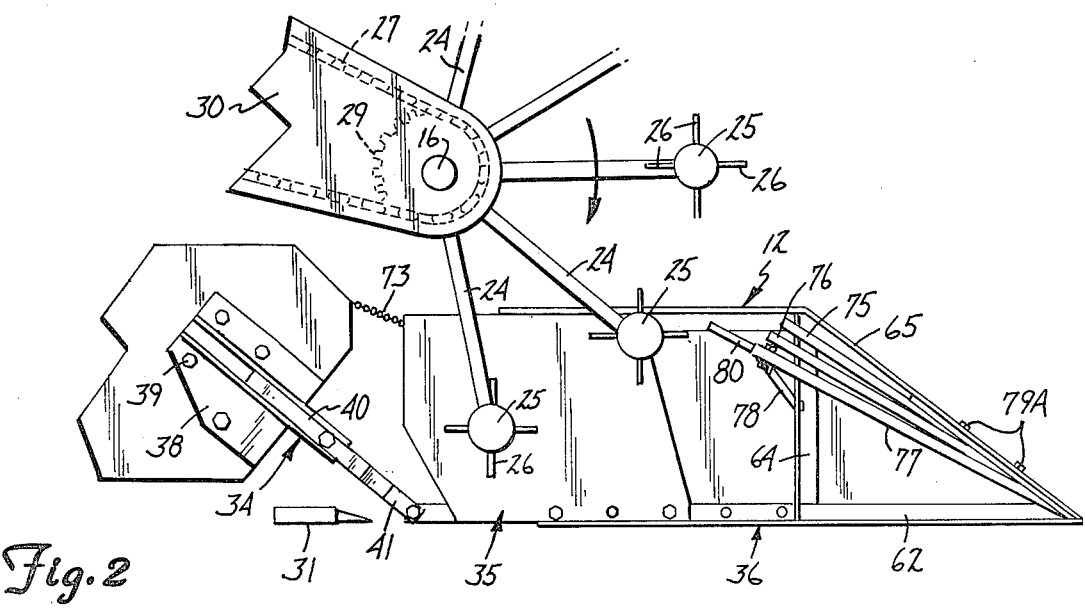
FIG. 2 is a sectional view of the combine header of FIG. 1 taken along the line 2—2 thereof.

Referring to the drawings, there is shown in FIGS. 1 and 2 a combine header 10 in harvesting relationship to a field of crops shown to be soybean plants 11 planted respectively in rows 11A through 11E. Combine header 10 is equipped with divider assemblies 12, 14 according to the present invention. Combine header 10 includes a reel 15 mounted on an axle 16 extended between left and right header side plates 17, 18. One end of axle 16 is secured to a bearing block assembly 20 fixed to header side plate 18 and covered by protective cap 21. The opposite end of axle 16 is similarly fastened to the other header side plate 17.

A plurality of spokes 24 extend radially from axle 16 from locations at both ends of axle 16. The outer ends of spokes 24 carry lateral cross member or rungs 25 forming the perimeter of reel 15. Each of the rungs 25 carries a plurality of laterally spaced apart sets of fingers or tines 26. An endless drive chain 27 extends from a power source (not shown) and is trained about a sprocket 29 and part of chain 27. Chain 27, through sprocket 29, is operative to drive reel 15 in a clockwise direction of rotation, as viewed in FIG. 2. A cutter bar or sickle bar 31 is mounted laterally or transversely on the header 10 and is positioned beneath the lower run of the rungs 25 as they rotate about axle 16.

Combine header 10 operates in usual fashion is set up and poise soybean plants 11 in the path of cutter bar 31 to be cut and processed in the normal manner. As combine header 10 advances in the direction of arrow 33, shown in FIG. 1, reel 15 rotates to bring tines 26 on rungs 25 into contact with soybean plants 11. The tines 26 lift the plants and poise them preparatory to their being cut by cutter bar 31. Outside rows of soybean plants 11A and 11E are located peripheral to the path of the reel 15 and might normally be missed by reel 15 and even become entangled with axle 16 to affect the functioning of the machine. Guide assemblies 12 and 14 guide these peripherally located soybean plants into the path of travel of the advancing reel 15 where they are captured by tines 26 on rungs 25 and are advanced with other soybean plants into the cutter bar 31.

As shown in FIGS. 1 through 3, divider assembly 12 includes a mounting assembly, indicated generally at 34, which mounts first or trailing and second or leading divider sections 35, 36. Mounting assembly 34 includes a mounting plate 38 fastened by suitable fasteners or bolts 39 to the inside surface of header side plate 17. A first mounting arm 40 is fastened at one end to the mounting plate 38 and extends forwardly at a downward inclination therefrom. A second mounting arm 41 is adjustably connected to the outward end of the first mounting arm 40 and extends forward therefrom at a downward inclination. As shown in FIG. 8, the first mounting arm 40 is channel shaped and has a plurality of aligned, spaced apart fastening openings 43. Arm 40 can be a rectangular tubular member. The second mounting arm 41 is configured to be nested in the channel of the first mounting arm 40 and has a second plurality of spaced apart fastening openings 44. When the end of the second mounting arm 41 is nested in the channel of the first mounting arm 40, at least one of the holes 44 can be selectively aligned with at least one of the holes 43. A bolt 45 is insertable through the aligned holes 43, 44 and is secured with a nut 46. The length of mount assembly 34 formed by the first and second arms 40, 41 is thus readily adjustable in the longitudinal direction of the mount assembly. This adjustability in length of the mounting assembly 34 permits the divider assembly 12 to be accommodated on various types and models of harvesting equipment. In addition, the length is adjustable according to the type of terrain to be traversed.

The outer end of second arm 41 is laterally offset by a shoulder 48 and terminates in bifurcated fingers 49 having mutually aligned mounting holes 50. Shoulder 48 is offset sufficiently to longitudinally align fingers 49 ahead of the front edge of left header side plate 17, as shown in FIG. 1. As shown in FIG. 1, shoulder 48 projects laterally in an outward direction away from the end of reel 15.

As shown in FIG. 5, trailing divider section 35 includes a frame having a lower frame member 52 and a generally upright, rearwardly inclined forward frame member 53 connected at the forward end of the lower frame member 52. A short, upper horizontal frame member 54 is connected to the upper end of the forward frame member 53 and extends rearwardly therefrom a short distance. An intermediate vertical frame member 55 extends downwardly from the rear end of the upper frame member 54 to a location intermediate on the lower frame member 52. A sheet member 57 of sheet metal or like sheet type material is connected to span between the lower frame member 52, the forward frame member 53, and the upper frame member 54. The sheet member 57 extends rearwardly from the vertical intermediate frame member 55 along the lower frame member 52. As shown in FIG. 3, the lower frame member 52 can be comprised of a square tubular member adapted to fit between the bifurcated fingers 49 on the second arm 41 of mounting assembly 34. The end of the lower frame member 52 is provided with a hole or mounting opening 58 for alignment with the mounting holes 50 of the bifurcated fingers 49. A bolt 59 is insertable through the mounting holes 50 of the fingers 49 and the mounting hole 58 of the lower frame member 52 to pivotally connect the trailing divider section 35 to the second arm 41 of mounting assembly 34. Bolt 59 is secured by a nut 60. Trailing divider section 35 is pivotally assembled to the outer forward end of the second arm 41 for up and down movement or pivotal movement in a vertical plane.

Leading divider section 36 has a frame including a lower frame member 62 and an upper frame member 63. A vertical frame member 64 extends from the forward end of the upper frame member 63 down to an intermediate location of the lower frame member 62. Lower frame member 62 extends beyond the lower end of the vertical frame member 64 to a forward tip or apex formed at the junction of the forward end of lower frame member 62 and the lower end of a diagonal frame member 65. Frame member 65 extends from the forward end of the upper frame member 63 downwardly and forwardly to the forward end of the lower frame member 62. A leading divider section sheet member 67 is attached to the frame members 62, 63, 64, and 65 to cover the area emcompassed by the frame members of the leading divider section 36. Sheet member 67 can be sheet metal or other suitable sheet material. The lower and upper frame members 62, 63 are comprised of angle iron forming a channel of sufficient height for receipt of the forward portion of the trailing divider section 35. The forward end portion of the trailing divider section 35 is insertable between the lower and upper frame members 62, 63 and longitudinally adjustable therein to vary the length spanned by the trailing and leading divider sections 35, 36. The horizontal portion of the upper frame member 63 of the leading divider section 36 has a plurality of mounting holes 68 formed about vertical axes. The vertical portion of the lower frame member 62 has a plurality of mounting holes 69 formed about horizontal axes. The upper frame member 54 of the trailing divider section 35 has a mounting hole 70 formed in the horizontal portion thereof. In addition, a plurality of mounting holes 71 are formed in the lower frame member 52 of the trailing divider section 35 extending through the frame member 52 and the overlapping portion of the sheet member 57. With the forward portion of the trailing divider section 35 inserted between the upper and lower frame members 63, 62 of the leading divider section 36, the upper mounting holes 70 of upper frame member 54 can be aligned with any of the mounting holes 68 in the upper frame member 63 of the leading divider section 36. The mounting holes 71 in the lower frame member 52 of the trailing divider section 35 are relatively aligned and spaced and correspond to the spacing between the mounting holes 69 and the lower frame member 62 of the leading divider section 36 such that with the upper holes 70 aligned with any of the mounting holes 68, the lower holes 71 will be aligned with one or more of the mounting holes 69 in the lower frame member of the leading divider section 36. Suitable nut and bolt assemblies are useable to secure the trailing divider section 35 and the leading divider section 36.

Divider sections 35, 36 are pivotal in a vertical plane about the axis of bolt 59 in order to traverse bumps, ridges, rough terrain, and the like. A flexible link or chain 73 is connected at one end to the upper end of vertical frame member 55 of trailing divider section 35. The opposite end of chain 73 is connected to the combine header side plate 17. Chain 73 serves to space the lower edges of lower frame members 52 and 62 of divider sections 35, 36 a desired distance above the ground as the combine header progresses over the ground in a forward direction. Chain 73 limits the downward pivotal movement of the divider sections 35, 36.

Leading divider section 36 includes a guide assembly or means to guide crops or plants encountered by the leading edge of the leading divider section 36 laterally inward to the path of travel of the reel for harvesting. A plurality of guide rods 75, 76, 77 are fixed to the frame of leading divider section 36 proximate the apex formed by the diagonal frame member 65 and the forward end of lower frame member 62. As shown in FIGS. 3, 4, and 7, the forward ends of rods 75, 76, and 77 are secured by welds or the like to a right angle member or support 79. Support 79 fits into frame member 65 adjacent the forward end thereof and is attached thereto with nut and bolt assemblies 79A. Guide rods 75, 76, 77 are arranged in a rearwardly divergent plow-like configuration to effect smooth movement of the upper portions of the plants to the path of the harvester. The guide rods can be elongate tubular members fastened to the lower end of the diagonal frame member 65 by suitable means, such as welding. The first guide rod 75 extends from an intermediate location on diagonal frame member 65 rearwardly and upwardly, and in slightly inwardly diverging relationship to the diagonal frame member 65. The second guide rod 76 extends from diagonal frame member 65 at a location slightly beneath the first guide bar 75. Second guide rod 75 extends upwardly and in inwardly diverging relationship relative to the first guide rod 75 at a slightly lower inclination than the first guide rod 75. The third guide rod 77 extends from the apex of the diagonal frame member 65 and lower frame member 62. Third guide rod 77 extends rearwardly in slightly inwardly diverging relationship to the second guide rod 76 and at a slightly lower inclination relative to the second guide rod 76. A brace member 78 extends from a location near the end of third guide rod 77 to the middle of intermediate vertical frame member 64 of leading divider section 36. Brace member 78 serves to strengthen and impart rigidity to the guide structure formed by guide rods 75 through 77. Together, guide rods 75 through 77 form a fan-like or plow-like configuration to direct exposed crop portions located peripherally along the path of reel 15 into the path of reel 15.

The rearward end of third guide rod 77 is comprised as a flexible terminal portion or tubular member 80. As shown in FIG. 6, flexible member 80 can be comprised as a length of hose telescopically inserted into the end of third guide rod 77. A bolt 81 secured by a nut 82 passes through the end of third guide rod 77 and through the inside end of flexible member 80 to secure it in place with respect to the end of the third guide rod 77. Nut and bolt assembly 81, 82 also serves to secure the end of brace member 78 to rod 77. Flexible member 80 serves as an extension of the third guide rod 77 to further guide peripherally orientated crops into the path of travel of the reel 16 for harvesting. Flexible member 80 terminates near the rotational path of travel of the rungs 25 of reel 15. On occasion, trailing and leading divider sections 35, 36 are apt to be pivoted up about the pin or bolt 59 when the pump or ridge in the terrain is encountered. This places the rear ends of the guide rods in closer proximity to the path of travel of the rungs 25 of reel 15. When flexible member 80 is moved to a position where it is struck by one of the rungs 25, it yields to the pressure of the rung 25 and is diverted out of the way. Neither the top of the guide rod 77 is damaged, nor any portion of the rungs 25.

The opposite divider assembly 14 is constructed and operates in like fashion to that of the first divider assembly 12. As shown in FIG. 1, mounting assembly 84 mounts a trailing divider section 85 and a leading divider section 86 in pivotal relationship to the right header side plate 18. The mounting assembly 84 has an arm 87 with an offset shoulder 88 to offset the mounting position of the trailing divider section 85 and align it with the header side plate 18. A flexible member or chain 89 connected to side plate 18 and the top of diverter assembly 14 limits downward pivotal movement of the diverter assembly 14. A plurality of guide rods 90, 91, 92 are assembled to the leading portion of leading divider section 86 and extend rearwardly therefrom and in inwardly diverging relationship. The guide rods 90–92 form a fan-like configuration to guide the peripherally orientated exposed crop portions into the path of travel of reel 15. A flexible terminal portion 94 is located on the end of the third guide rod 92 so as to avoid damage of the rungs 25 or the terminal portion of the guide rod when the end portion of the guide rod is moved into the rotational path of travel of the rungs 25 with reel 15.

In use, referring to the first or left divider assembly 12, mounting plate 38 of mounting assembly 34 is installed on the inboard surface of the left header side plate 17 with the first mounting arm 40 downwardly and forwardly orientated. The second mounting arm 41 is assembled to the first mounting arm 40 and secured by suitable nut and bolt assembly 45, 46. The length of the combined first and second arms 40, 41 is adjustable according to the make and manufacture of combine header upon which the unit is being installed and according to the surface of the terrain to be traversed. Adjustment of the length of the arms 40, 41 moves the pivot point provided by the fingers 49 upwardly and rearwardly, or forwardly and downwardly. The rear end of the lower frame member 52 of trailing divider section 35 is installed between the bifurcations by the fingers 49 on the end of the second arm 41 of the mounting assembly 34. Leading divider section 36 is assembled to the trailing divider section 35 and secured thereto by suitable bolt and nut assemblies as earlier described. The combined length of the leading and trailing divider sections is adjustable according to the type of terrain to be traversed.

With the left and right divider assemblies so installed on the combine header 10, as the header progresses in a forward direction, as indicated by the arrow 33 in FIG. 1, the exposed portions of peripherally located crops as those shown in rows 11A and 11E are diverted by the guide rods of the divider assemblies into the path of travel of the reel. From this position they are harvested with the other crops located in the path of travel of the reel. Should the divider assemblies encounter bumps or rough terrain whereby they are pivoted upwardly to a point where the tip of the guide rods encroaches upon the path of travel of the rungs 25, no damage is done to either the flexible terminal portions of the guide rods or to the rungs.

Referring to FIGS. 9 and 10, there is shown an alternate embodiment of the mount assembly indicated generally at 100 for connecting a crop divider assembly, such as crop divider assembly 14, to a header of a combine. The mount assembly 100 is longitudinally and vertically adjustable so that the pivot connection between the mount assembly and divider assembly can be located in a desired position. The mount assembly 100 in FIG. 9 is shown with its forward end in a down mounting position. The forward end of the mount assembly 100 in FIG. 10 is shown in its up or elevated position. Mount assembly 100 is connected to side portion 101 of the header frame and projects therefrom in a forward direction. Lower frame member 52 of diverter assembly 14 is pivotally connected to the forward end of mount assembly 100 so as to permit diverter assembly 14 to pivot up and down relative to the ground.

Mount assembly 100 has a first arm 102 connected to a second arm 107. Arms 102 and 107 are longitudinally adjustable relative to each other so that the overall length of the mount assembly can be adjusted to accommodate different types of combine headers. First arm 102 has a body 103 having a generally U-shaped cross section. Body 103 is an elongated channel member having a plurality of longitudinally spaced holes 104. A lateral member or leg 105 is secured to the inner end of body 103. Lateral member 105 has a plurality of holes accommodating nut and bolt assemblies 106 that mount the arm 102 on header frame 101. Body 103 projects forwardly and upwardly from the lateral member 105. Member 105 can be bolted directly to the end of a sickle bar.

Second arm 107 has a body 108 having a plurality of holes 109. Holes 109 are adapted to be aligned with the holes 104 and accommodate a nut and bolt assembly 111 for securing the second arm to body 103. Holes 104 and 111 permit the second arm 107 to be longitudinally adjustable relative to the first arm 102 thereby providing adjustment for the overall length of the mount assembly 100. Body 108 of the second arm fits in the channel of the body 103 so that a single nut and bolt assembly 111 holds the first and second arms in assembled relation with each other.

The forward end of body 108 is secured to a pair of side members or plates 112 and 113. Plates 112 and 113 extend in a lateral direction relative to the body 108. Plates 112 and 113 have first holes 114 and 116 and second holes for accommodating a nut and bolt assembly 118 that pivotally connect the divider frame member 52 to plates 112 and 113. The nut and bolt assembly 118 is a pivot member that allows the divider assembly 14 to pivot up and down about a generally horizontal axis. The nut and bolt assembly 118 can be used to pivotally mount the divider frame member 52 to the ends of plates 112 and 113 having the holes 114 and 116 which are generally aligned with body 108.

As shown in FIG. 10, the body 108 and plates 112 and 113 have been turned to a position wherein the plates 112 and 113 extend in an upward direction. This locates the nut and bolt assembly 118 in its up position thereby raising the pivot location for the divider frame 52.

The mount assembly 100 is adjustable to change the longitudinal and elevational position of the pivot nut and bolt assembly 118. This adjustment allows the mount assembly 100 to be used with different types of headers without altering the header structure.

While there has been shown and described a preferred embodiment of a crop guide assembly and mount assemblies used with a combine header according to the invention, it would be apparent to those skilled in the art that certain deviations can be had from the embodiments shown without departing from the scope and spirit of the invention.

The embodiments of the invention in which an exclusive property or privilege is claimed are defined as follows:

1. A crop divider assembly mountable on a combine header to divert peripherally located crops into the path of travel of the combine header for harvesting, comprising: arm means adjustable in length having one end fixed to header structure and another end extended forwardly from the header structure; a trailing divider section having a first frame and a first vertically disposed sheet member spanning the area defined by the first frame; means pivotally connecting a rear portion of the frame of the trailing divider section to the outer end of the arm means for pivotal movement in a vertical plane; a leading divider section having a second frame and a second sheet member spanning the area defined by the second frame; the rear part of said leading divider section being telescopically assembled to the forward part of said trailing divider section and adjustable with respect thereto whereby the length spanned by the leading divider section and the trailing divider section is adjustable; means to secure the leading divider section with respect to the trailing divider section; a guide assembly fixed to the forward end of the leading divider section to guide peripherally located crops encountered by the leading divider section inward toward the path of travel of the header for harvesting, said guide assembly including a plurality of guide rods extending inwardly from the forward end of the leading divider section in rearwardly diverging relationship in a fan-type configuration.

2. The crop divider assembly of claim 1 wherein: said frame of the leading divider section includes an upper horizontal frame member, a lower horizontal frame member extended ahead of the upper horizontal frame member, and a diagonally inclined member extended from the forward end of the upper frame member to the forward end of the lower frame member forming with the forward end of the lower frame member a forward apex, said guide means extended rearwardly and inwardly from proximate the forward apex.

3. The crop divider assembly of claim 2 wherein: said guide assembly includes a first guide rod secured at one end to said diagonal frame member of the divider section and extending upwardly, inwardly and rearwardly therefrom, a second guide rod secured at one end to the diagonal frame member at a location beneath the first guide rod and extending upwardly, inwardly, and rearwardly therefrom at an inclination less than the first guide rod, and a third guide rod assembled to the diagonal frame member near said apex and beneath the second guide rod and extending upwardly, inwardly, and rearwardly therefrom at an inclination less than that of the second guide rod, said third guide rod having a flexible terminal portion.

4. The crop divider assembly of claim 1, 2, or 3 including: a flexible link connected at one end to the trailing divider section and at the opposite end to the header to limit the downward pivotal movement of the leading divider section and the trailing divider section.

5. The crop divider assembly of claim 3 wherein: the upper frame member and the lower frame member of the leading divider section form a rearwardly open channel; the forward part of the trailing divider section being telescopically and adjustably engaged in said channel; a plurality of mounting holes formed in the upper and lower frame members of the leading divider section; a plurality of mounting holes formed in the frame of the trailing divider section for selective alignment with the holes formed in the upper and lower frame members of the leading divider section; and fastening means to selectively fasten mating holes between the holes in the upper and lower frame members of the leading divider section and the holes in the frame of the trailing divider section to secure the leading divider section at a selected position with respect to the trailing divider section.

6. The crop divider assembly of claim 5 including: a flexible link connected at one end to the trailing divider section and at the opposite end to the header to limit the downward pivotal movement of the leading divider section and the trailing divider section.

7. The crop divider assembly of claim 1, 2, 3, 5 or 6 wherein: said arm means includes a first arm secured at a rearward end to header structure and having a forward end extended forward and downward therefrom, a second arm having a rearward end adjustably assembled to the forward end of the first arm and linearly extended therefrom, said second arm having a shoulder at the forward end, said shoulder offsetting the forward end of the second arm so that it is in alignment with the leading edge of the header structure, said trailing divider assembly being pivotally assembled to the forward end of the second arm.

8. The crop divider assembly of claim 7 wherein: said arm means includes a mounting plate mounted to the inboard side of said header structure, said rearward end of the first arm being secured to the mounting plate.

9. The crop divider assembly of claim 1 wherein: said arm means includes a first arm having a member adapted to be secured to the combine header, and a second arm mounted on the first arm, said second arm having means accommodating the means pivotally connecting a rear portion of the frame to the outer end of the arm means.

10. The crop divider assembly of claim 9 wherein: the first arm includes a body, said member being secured to and laterally projected from the body, the second arm has a member mounted on the body, said means of the second arm comprising a pair of plates secured to the member of the second arm and projected laterally therefrom.

11. The crop divider assembly of claim 10 wherein: the body is a channel member having a longitudinal channel, said member of the second arm being located in the channel of the channel member, and means securing the member of the second arm to the channel member.

12. The crop divider assembly of claim 10 or 11 wherein: said body has a plurality of longitudinally spaced first holes and said member of the second means has a plurality of longitudinally spaced second holes, and releasable means located in selected aligned first and second holes to hold the member of the second arm in a selected position on the body whereby the length of the arm means can be adjusted.

13. An apparatus mountable on an implement movable along the ground to divert crops into the path of travel of the implement, comprising: crop divider means having crop guide means to direct crops into the path of movement of an implement, mount means for attaching the crop divider means to a portion of said implement, said mount means having a first arm, said first arm having means to mount the first arm on said implement, a second arm, said second arm having means to accommodate pivot means for pivotally connecting the crop divider means to said second arm to allow said crop divider means to move up and down relative to said second arm, pivot means for pivotally connecting the crop divider means and means to accommodate the pivot means, releasable means connecting the second arm to the first arm, said first and second arms having means cooperating with said releasable means operable to selectively adjust the location of the first arm and second arm relative to each other to adjust the length of the mount means; said means cooperating with the releasable means including a channel member on the first arm with a longitudinal channel, said second arm having a member located in the channel, said releasable means securing the member of the second arm to said channel member.

14. The apparatus of claim 13 including: means connectable to the implement and crop divider means to limit downward pivotal movement of the crop divider means.

15. The apparatus of claim 13 wherein: the means to accommodate the pivot means includes a shoulder laterally directed from the second arm, said shoulder having at least one member provided with means for accommodating the pivot means.

16. The apparatus of claim 13 or 15 wherein: said means to mount the first arm on the implement includes a mounting plate attached to the first arm.

17. The apparatus of claim 13 wherein: said means of the first arm includes a member laterally directed from the first arm means adapted to be secured to the implement.

18. The apparatus of claim 13 wherein: said means to accommodate the pivot means comprises a pair of plates secured to the second arm and projected laterally therefrom.

19. The apparatus of claim 13 wherein: said crop divider means includes a first frame means and a second frame means, said first and second frame means cooperating with each other allowing longitudinal adjustment of the crop divider means, and means for holding the first and second frame means in a selected adjusted position.

20. The apparatus of claim 13 wherein: said channel member has a plurality of longitudinally spaced first holes and said member of the second means has a plurality of longitudinally spaced second holes, said releasable means being located in selected aligned first and second holes to hold the channel member of the second arm in a selected position on said channel member whereby the length of the mount means can be adjusted.

21. The apparatus of claim 13 wherein: said crop guide means includes a plurality of rods secured to a forward portion of the crop divider means and extends upwardly, inwardly and rearwardly from said forward portion.

22. The apparatus of claim 21 including: flexible means secured to and extended rearwardly from the terminal portion of one of said rods.

23. An apparatus mountable on an implement movable along the ground to divert crops into the path of travel of the implement, comprising: crop divider means having crop guide means to direct crops into the path of movement of an implement, mount means for attaching the crop divider means to a portion of said implement, said mount means having a first arm, said first arm having means to mount the first arm on said implement, a second arm, said second arm having means to accommodate pivot means for pivotally connecting the crop divider means to said second arm to allow said crop divider means to move up and down relative to said second arm, pivot means for pivotally connecting the crop divider means and means to accommodate the pivot means, releasable means connecting the second arm to the first arm, said first and second arms having means cooperating with said releasable means operable to selectively adjust the location of the first arm and second arm relative to each other to adjust the length of the mount means; said crop divider means including a trailing divider section having a first frame and a first vertically disposed sheet member spanning the area defined by the first frame, and a leading divider section having a second frame and a second sheet member spanning the area defined by the second frame, the rear part of said leading divider section being telescopically assembled to the forward part of said trailing divider section and adjustable with respect thereto whereby the longitudinal length spanned by the leading and trailing divider sections is adjustable, and means to secure the leading divider section to the trailing divider section, said crop guide means being secured to the forward end of the leading divider section to guide crops encountered thereby inwardly toward the path of travel of said implement.

24. The apparatus of claim 23 wherein: said crop guide means includes a plurality of guide rods extended inwardly from the forward end of the leading diverter section in rearwardly diverging relationship.

25. The apparatus of claim 24 wherein: said plurality of guide rods includes a first guide rod, a second guide rod located inwardly of the first guide rod, and a third guide rod extended or located inwardly of the second guide rod, each of said guide rods extended upwardly and rearwardly from said forward end.

26. The apparatus of claim 25 including: an elongated flexible member secured to the terminal portion of said third guide rod.

27. The apparatus of claim 23 wherein: said first frame includes an upright horizontal frame member, a lower horizontal frame member extended ahead of the upper horizontal frame member, and a diagonally inclined member extended from the forward end of the upper frame member to the forward end of the lower frame member forming with the forward end of the lower frame member a forward apex, said crop guide means extended rearwardly and inwardly from approximate said forward apex.

* * * * *